United States Patent
Liao et al.

(10) Patent No.: US 6,590,767 B2
(45) Date of Patent: Jul. 8, 2003

(54) PORTABLE COMPUTER DOCKING STATION FOR HORIZONTAL OR VERTICAL USE

(75) Inventors: Reynold L. Liao, Austin, TX (US); Sean P. O'Neal, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 09/972,459

(22) Filed: Oct. 5, 2001

(65) Prior Publication Data

US 2003/0067743 A1 Apr. 10, 2003

(51) Int. Cl.7 ................................. G06F 1/16

(52) U.S. Cl. ............... 361/686; 361/679; 248/917; 312/223.2

(58) Field of Search ................. 361/686, 679, 361/680, 681–685, 687; 248/918, 124.1, 122.1, 122, 917, 919–923; 312/223.2, 223.3

(56) References Cited

U.S. PATENT DOCUMENTS

| | | | | |
|---|---|---|---|---|
| 5,457,601 A | * | 10/1995 | Georgopulos et al. | 361/686 |
| 5,488,537 A | * | 1/1996 | Heald et al. | 361/684 |
| 5,995,366 A | | 11/1999 | Howell et al. | 361/686 |
| 6,061,234 A | | 5/2000 | Broder et al. | 361/686 |
| 6,118,654 A | * | 9/2000 | Bhatia | 361/687 |
| 6,222,728 B1 | | 4/2001 | Jaggers et al. | 361/686 |
| 2001/0000447 A1 | * | 4/2001 | Thompson | 361/686 |

* cited by examiner

Primary Examiner—Darren Schuberg
Assistant Examiner—Hung Van Duong
(74) Attorney, Agent, or Firm—Haynes and Boone, LLP

(57) ABSTRACT

A docking station can be horizontally supported on a desk surface or can be vertically supported on a wall or a partition. The docking station includes a substantially planar base. A docking connector is included in the base. A mounting member is also attached to the base. A portable computer can be coupled to the docking connector so that the computer extends substantially parallel to the base. The mounting member can be attached to the wall or partition whereby the base and the portable computer extend in a substantially vertical orientation.

19 Claims, 3 Drawing Sheets

PORTABLE COMPUTER DOCKING STATION FOR HORIZONTAL OR VERTICAL USE

BACKGROUND

The disclosures herein relate generally to portable computer docking at a docking connector, and more particularly, to docking a portable computer at a docking connector supported either vertically or horizontally.

Desk space is considered one of the more important aspects of computer design. Many consumers place a very high priority on desk space usage in a computer purchase. Consumer preferences for mobility have increased the availability and consumption of portable computer systems. These portable computer systems, however, based on the compact size of the system, may not include many of the features of a desktop computer system. Accordingly, many portable computer users purchase docking stations to facilitate the connection of their portable computer to external features such as larger external memory, larger external monitor, and other amenities not commonly available on portable computers.

Traditionally, a docking station for a portable computer is placed underneath the portable computer. While this serves the purpose of allowing the user to access the desktop features such as the external monitor and memory, this solution is inadequate in terms of efficiency of desk space usage.

Therefore, what is needed is a docking station that can completely remove the portable computer from the desk space.

SUMMARY

One embodiment, accordingly, provides a docking station that can be vertically supported or hung from a wall or other support member. To this end, a docking station includes a substantially planar base. A docking connector is provided on the base. A mounting member is attached to the base. The mounting member is attachable to a support so that the planar base extends in a substantially vertical orientation.

Several advantages are achieved by the method according to the illustrative embodiments presented herein. The embodiments provide for extremely minimized desk space use. Very little redesign is needed from existing docks. Furthermore, the portable computer can be docked at an ergonomically correct height and angle. Finally, the docking station can function as a traditional horizontal docking station.

DETAILED DESCRIPTION

Figure 1:
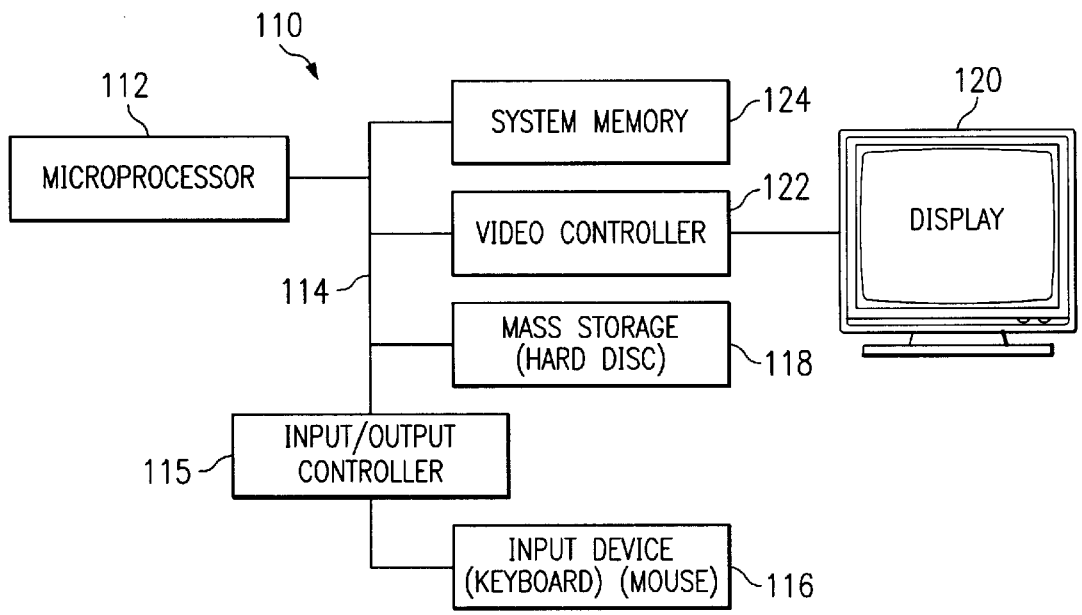
FIG. 1 is a diagrammatic view illustrating an embodiment of a computer system.

In one embodiment, computer system 110, FIG. 1, includes a microprocessor 112, which is connected to a bus 114. Bus 114 serves as a connection between microprocessor 112 and other components of computer system 110. An input system 116 is coupled to microprocessor 112 by an input/output controller 115, to provide input to microprocessor 112. Examples of input devices include keyboards, touchscreens, and pointing devices such as mouses, trackballs and trackpads. Programs and data are stored on a mass storage device 118, which is coupled to microprocessor 112. Mass storage devices include such devices as hard disks, optical disks, magneto-optical drives, floppy drives and the like. Computer system 10 further includes a display 120, which is coupled to microprocessor 112 by a video controller 122. A system memory 124 is coupled to microprocessor 112 to provide the microprocessor with fast storage to facilitate execution of computer programs by microprocessor 112. It should be understood that other busses and intermediate circuits can be deployed between the components described above and microprocessor 112 to facilitate interconnection between the components and the microprocessor.

Figure 2:
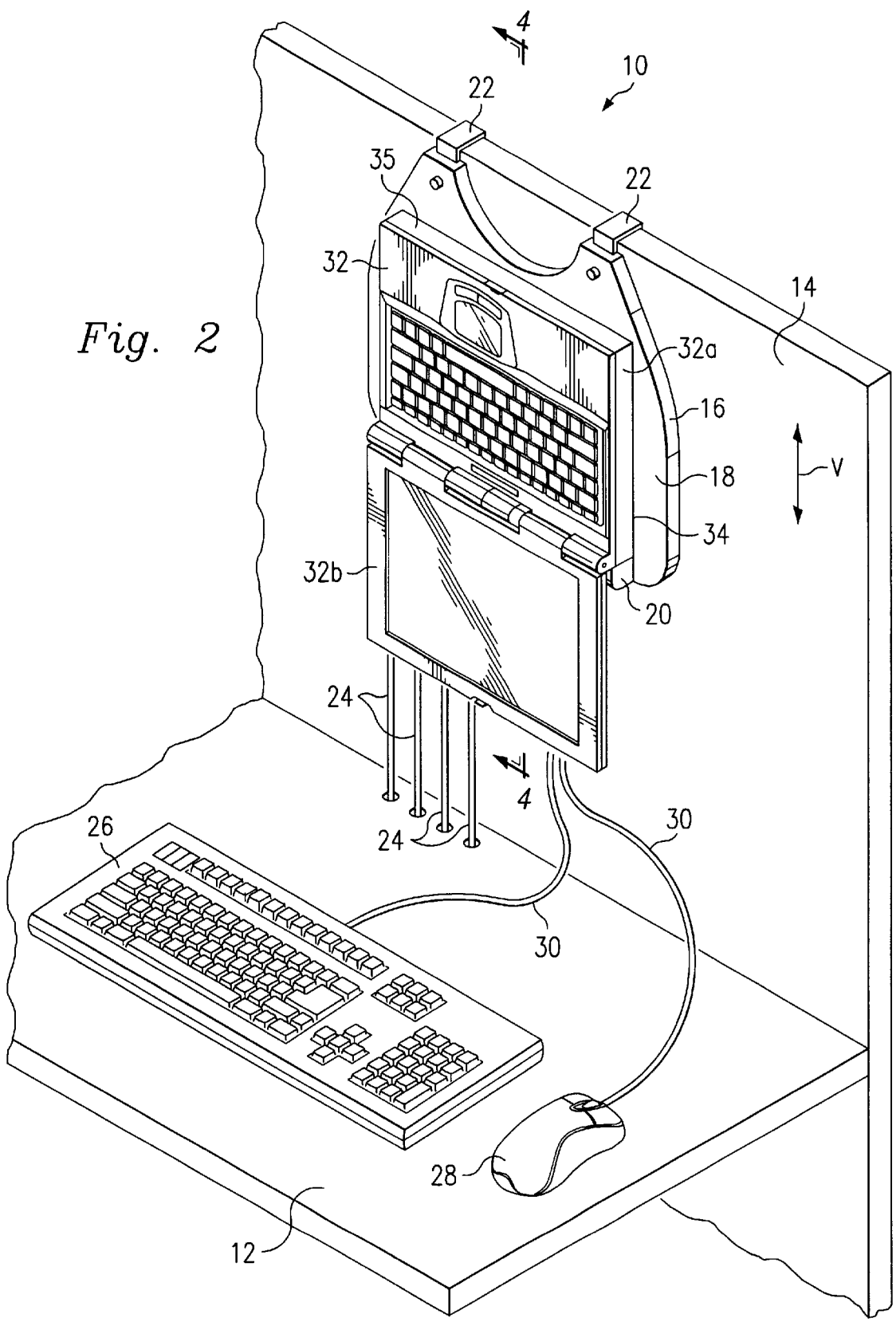
FIG. 2 is a perspective view illustrating an embodiment of a workstation.

A cubicle type workstation is generally designated 10 in FIG. 2 and includes a horizontal work surface 12 and a vertical support such as a wall 14. A docking station 16 is mounted to hang on wall 14. The docking station 16 includes a substantially planar base 18, a docking connector housing 20, including a connector, and at least one mounting member 22, but preferably a pair of mounting members 22. The mounting members 22 can attach to the wall 14 so that planar base 18 extends in a substantially vertical orientation as indicated by the directional arrow designated V.

A plurality of input-output (I/O) cables 24 extend from the docking station 16 for connection to an I/O source. A standard desktop keyboard 26 and mouse 28 are connected to docking station 16 by cables 30 for use with a portable computer 32, which includes computer system 110 described above, mounted on the docking station 16. As illustrated in FIG. 2, a back surface 34 of portable computer 32 includes a docking connector adjacent the docking connector housing 20. As illustrated, a base portion 32a of portable computer 32 is substantially parallel to base 18 and is therefore also in a substantially vertical orientation as indicated at V. A display portion 32b of portable computer 32 is hinged at 38 and is fully opened to extend inverted from base portion 32a. To enable the display to be readable in this inverted orientation, there is software available which is capable of inverting data displayed. This is accomplished by a BIOS setting that permits the user to decide if the display should invert when fully opened.

Another possible orientation is to dock the computer 32, so that a front surface 35 of computer base portion 32a is adjacent the docking connector housing 20 for coupling to a connector in housing 20. In this orientation, the display portion 32b would not be inverted as discussed above, thus eliminating the need for the software required to invert the data displayed on the display portion 32b. In order to accomplish this orientation a connector is required in the front surface 35 for coupling to the connector in housing 20.

Figure 3:
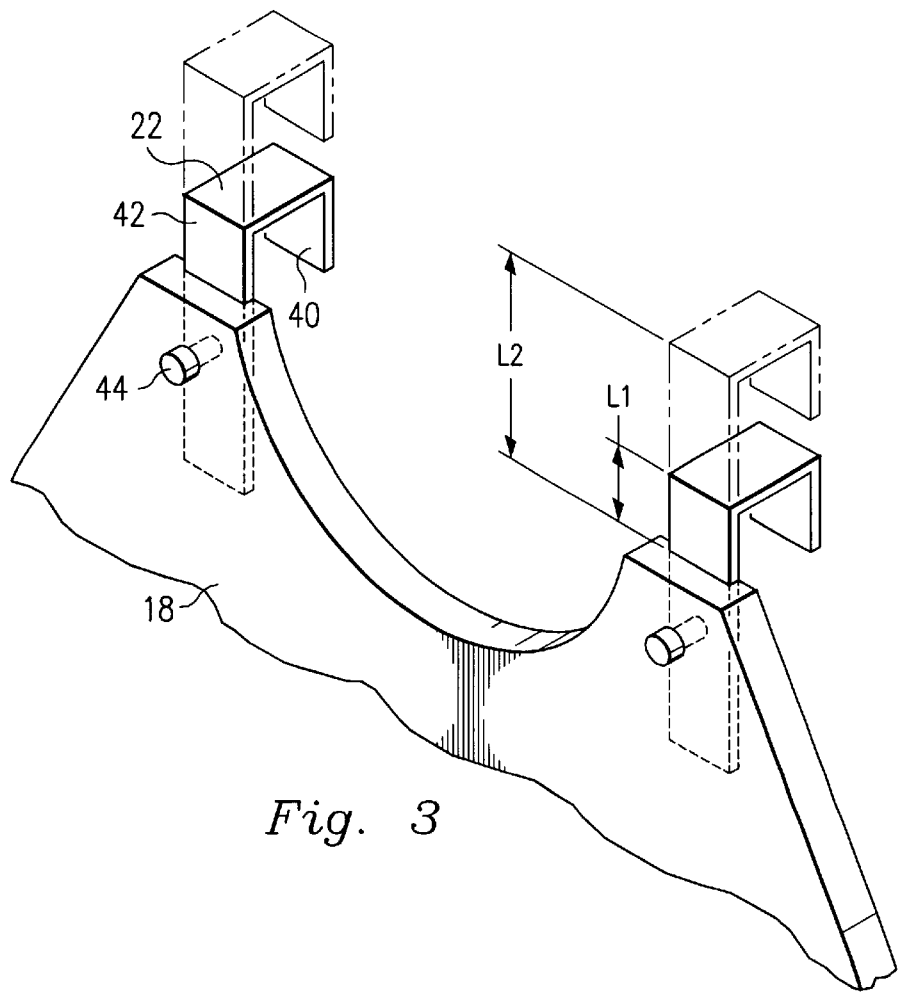
FIG. 3 is a partial perspective view illustrating an embodiment of a docking station including adjustable mounting members.

Mounting members 22, FIG. 3, extend from planar base 18. A length adjustment may be provided between a first length L1 and a maximum second length L2 to provide for an ergonomically suitable height for the display portion 32b, FIG. 2, to suit the user. An exemplary length adjustment, FIG. 3, can be provided by attaching at least one hook member 40 formed with a slide member 42, and adjustably connecting the slide member 42 to planar base 18 by means of an adjustable fastener 44, or the like. The mounting members 22 are preferably removable modular members so that upon removal, the docking station 16 can be used in a conventional horizontal orientation.

Figure 4:
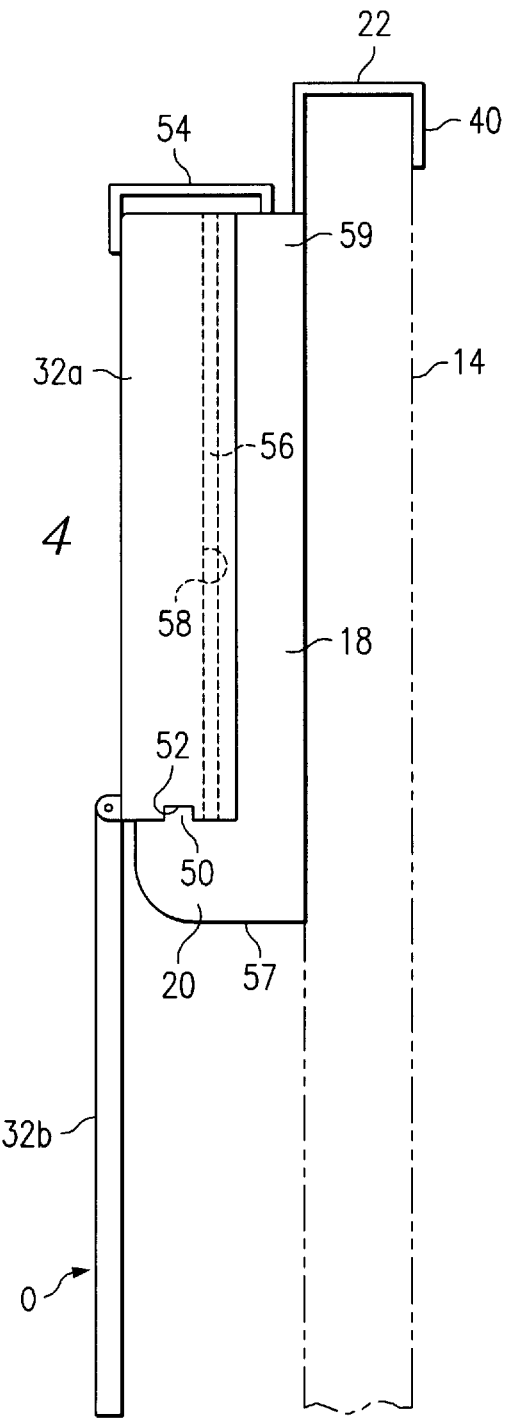
FIG. 4 is a cross-sectional view partially illustrating an embodiment of the workstation as viewed along line 4—4 of FIG. 2.

A connector 50 provided at a first end 57 of planar base 18, FIG. 4, protrudes from connector housing 20 and is coupled to a connector 52 in base portion 32a of computer 32. Display portion 32b is pivoted to an open position O. Base portion 32a of computer 32 is retained on planar base 18 by, for example, a clamp 54 which extends from a second end 59 of planar base 18. Alternatively, a rail member 56 may extend from planar base 18 for sliding engagement in a groove 58 provided in base portion 32a of computer 32. Hook 40 of mounting member 22, is positioned at the second end 59 of planar base 18, which is opposite the first end 57.

Figure 5:
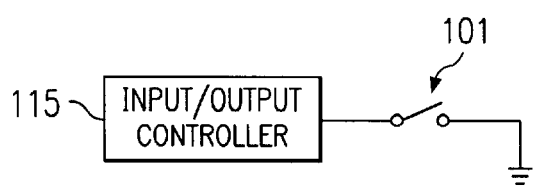
FIG. 5 a schematic view illustrating an embodiment of a switch connected to an input/output controller.

Another embodiment, FIG. 5, provides a means to signal the docking station 16 to know if it is in a horizontal or vertical orientation. This can be accomplished by a switch 101, FIG. 5, which can be a manual toggle switch on the docking station 16 which permits a user to select between horizontal or vertical. Also, the switch 101 on the docking station 16 can be automatically triggered when the hook members 40 are attached to the docking station 16. Furthermore, a mercury switch can be provided on the docking station 16 that is triggered depending on whether the docking station 16 is in a vertical or horizontal orientation. As a further alternative, a BIOS question can be added which allows a user to enter a keystroke or click on a user interface application that tells the computer if the docking station 16 is in vertical or horizontal orientation.

Advantageously, the docking station is provided such that the mounting feature, hooks or screw mount etc. are modular. This would allow the mounting apparatus to be provided to hang the docking station from cubical walls, integrated into a modular office design, or simply screwed into a wall. With the mounting feature removed, the docking station could be used conventionally (horizontally). These mounting features can have adjustable heights for ergonomic and logistical reasons. The strength requirement for the mounting features is easily accomplished with readily available, reasonably priced materials.

The removable mounting features could be built-to-order, ship-to-order, or a future upgrade to customers. There would be almost no cost burden for customers choosing to remain with their current docking station scheme.

Although illustrative embodiments have been shown and described, a wide range of modification change and substitution is contemplated in the foregoing disclosure and in some instances, some features of the embodiment may be employed without a corresponding use of other features. Accordingly, it is appropriate that the appended claims be construed broadly and in a manner consistent with the scope of the embodiments disclosed herein.

What is claimed is:

1. A docking station comprising:
   a substantially planar base;
   a docking connector on the base; and
   a length adjustable mounting member attached to hang the base suspended from a substantially planar vertical support member, whereby the planar base extends in a substantially vertical orientation.

2. The docking station as defined in claim 1 wherein the mounting member extends from the base.

3. The docking station as defined in claim 1 further comprising:
   a clamp.

4. The docking station as defined in claim 1 wherein the docking connector is at a first end of the base and the mounting member is at a second end of the base, opposite the first end.

5. The docking station as defined in claim 3 wherein the clamp is spaced apart from the docking connector.

6. A computer system comprising:
   a docking station having a substantially planar base;
   a portable computer supported on the base;
   a microprocessor mounted in the portable computer;
   a storage coupled to the microprocessor;
   a docking connector on the base and coupled to the portable computer; and
   a length adjustable mounting member attached to hang the base suspended from a substantially planar vertical support member, whereby the planar base and the portable computer extend in a substantially vertical orientation.

7. The system as defined in claim 6 wherein the mounting member extends from the base.

8. The system as defined in claim 6 further comprising:
   a clamp attached to the base and engaged with the computer.

9. The system as defined in claim 6 wherein the docking connector is at a first end of the base and the mounting member is at a second end of the base, opposite the first end.

10. The system as defined in claim 6 further comprising:
    means for signaling whether the docking station is in the vertical or horizontal orientation.

11. The system as defined in claim 8 wherein the clamp is spaced apart from the docking connector.

12. A method of suspending a docking station in a vertical orientation comprising:
    providing a docking station with a substantially planar base;
    providing a docking connector on the base;
    attaching a length adjustable mounting member to hang the base suspended from a substantially planar vertical support member;
    coupling a portable computer to the docking connector so that the portable computer extends substantially parallel to the base;
    attaching the mounting member to the support member whereby the base and the portable computer extend in a substantially vertical orientation.

13. The method as defined in claim 12 further comprising:
    clamping the computer on the base.

14. The method as defined in claim 12 further comprising:
    connecting a first end of the computer to the docking connector; and
    clamping a second end of the computer on the base, the second end being opposite the first end.

15. The method as defined in claim 12 further comprising:
    adjusting the mounting member from a first length to a second length.

16. A docking station comprising:
    a substantially planar base;
    a docking connector on the base; and
    length adjustable means for hanging the docking station suspended from a substantially planar vertical support member so that the planar base is in a substantially vertical orientation.

17. The docking station as defined in claim 16 wherein the means for suspending extends from the base.

18. The docking station as defined in claim 16 further comprising:

means for securing a portable computer on the base.

19. The docking station as defined in claim 16 wherein the means for suspending the docking station includes a pair of mounting members.

\* \* \* \* \*